United States Patent
Tu et al.

(10) Patent No.: US 11,102,240 B2
(45) Date of Patent: Aug. 24, 2021

(54) EARLY-WARNING DECISION METHOD, NODE AND SUB-SYSTEM

(71) Applicant: Alibaba Group Holding Limited, Grand Cayman (KY)

(72) Inventors: Yifan Tu, Hangzhou (CN); Huilai Qiao, Hangzhou (CN); Jiong Jia, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 69 days.

(21) Appl. No.: 15/990,474

(22) Filed: May 25, 2018

(65) Prior Publication Data

US 2018/0278646 A1    Sep. 27, 2018

Related U.S. Application Data

(63) Continuation of application No. PCT/CN2016/106325, filed on Nov. 18, 2016.

(30) Foreign Application Priority Data

Nov. 27, 2015    (CN) .......................... 201510846433.3

(51) Int. Cl.
    *H04L 29/06*        (2006.01)
    *H04L 29/08*        (2006.01)
    *H04L 12/26*        (2006.01)

(52) U.S. Cl.
    CPC .......... *H04L 63/1458* (2013.01); *H04L 29/06* (2013.01); *H04L 29/08* (2013.01);
    (Continued)

(58) Field of Classification Search
    None
    See application file for complete search history.

(56) References Cited

U.S. PATENT DOCUMENTS 8,089,871 B2    1/2012 Iloglu et al.
10,616,251 B2 *  4/2020 Savalle ................. G06N 3/006
(Continued)

FOREIGN PATENT DOCUMENTS

CN    1838588 A     9/2006
CN    101388885     3/2009
(Continued)

OTHER PUBLICATIONS

Translation of CN Office Action from Corresponding CN Application No. 201510846433.3 dated Aug. 2, 2019, a counterpart foreign application for U.S. Appl. No. 15/990,474, 8 pages.

(Continued)

*Primary Examiner* — Jeffery L Williams
(74) *Attorney, Agent, or Firm* — Lee & Hayes, P.C.

(57) ABSTRACT

Early-warning decision method, node and system are provided in the present disclosure. The method includes obtaining a flow analysis result of a portion of service requests that are targeted at a same server; calculating a flow of all the service requests that are targeted at the server based on a flow indicated by the flow analysis result and a weight of a current distributed node, the weight being a weight or proportion of all the service requests targeted at the server that accounts for the flow indicated by the flow analysis result that is obtained by the current distributed node; comparing a flow of all the service requests that are targeted at the server with an abnormal flow threshold; and determining whether to send an instruction for performing subsequent processing on the server based on a comparison result.

17 Claims, 5 Drawing Sheets

(52) U.S. Cl.
CPC .......... *H04L 43/16* (2013.01); *H04L 63/1416* (2013.01); *H04L 67/1002* (2013.01); *H04L 2463/141* (2013.01)

(56) References Cited

U.S. PATENT DOCUMENTS

| | | | | |
|---|---|---|---|---|
| 2006/0272018 | A1* | 11/2006 | Fouant | H04L 63/1416 726/23 |
| 2007/0150955 | A1 | 6/2007 | Murase et al. | |
| 2008/0062891 | A1* | 3/2008 | Van der Merwe | H04L 45/04 370/254 |
| 2009/0182818 | A1* | 7/2009 | Krywaniuk | H04L 51/12 709/206 |
| 2009/0303901 | A1* | 12/2009 | Duffield | H04L 43/024 370/253 |
| 2010/0103837 | A1* | 4/2010 | Jungck | H04L 29/12066 370/252 |
| 2010/0242092 | A1* | 9/2010 | Harris | H04L 63/08 726/3 |
| 2010/0325272 | A1* | 12/2010 | Lloyd | H04L 45/124 709/224 |
| 2012/0047581 | A1 | 2/2012 | Banerjee et al. | |
| 2012/0324573 | A1 | 12/2012 | Kim et al. | |
| 2014/0157405 | A1* | 6/2014 | Joli | H04L 63/1425 726/22 |
| 2015/0106935 | A1 | 4/2015 | Burns et al. | |
| 2015/0195182 | A1* | 7/2015 | Mathur | G06F 11/3433 714/27 |
| 2015/0207706 | A1 | 7/2015 | Li et al. | |
| 2015/0229661 | A1* | 8/2015 | Balabine | H04L 43/04 726/22 |
| 2016/0021056 | A1* | 1/2016 | Chesla | H04L 63/02 726/11 |
| 2016/0036837 | A1* | 2/2016 | Jain | H04L 63/1416 726/23 |
| 2016/0182542 | A1* | 6/2016 | Staniford | H04L 63/1416 726/23 |
| 2016/0300227 | A1* | 10/2016 | Subhedar | G06Q 20/405 |
| 2017/0104773 | A1* | 4/2017 | Flacher | H04L 63/1458 |
| 2017/0111396 | A1* | 4/2017 | Chesla | H04L 63/1441 |
| 2018/0278646 | A1* | 9/2018 | Tu | H04L 63/1458 |
| 2020/0220896 | A1* | 7/2020 | Jiang | H04L 29/06 |

FOREIGN PATENT DOCUMENTS

| | | | |
|---|---|---|---|
| CN | 101562537 | | 10/2009 |
| CN | 102143143 | | 8/2011 |
| CN | 102769607 | A | 11/2012 |
| CN | 102801738 | | 11/2012 |
| CN | 103001825 | A | 3/2013 |
| CN | 104426906 | A | 3/2015 |
| CN | 105007312 | A * | 10/2015 |
| EP | 1705863 | A1 | 9/2006 |
| JP | 2008092069 | A | 4/2008 |
| JP | 201135932 | A | 2/2011 |
| WO | WO2015094869 | A1 | 6/2015 |

OTHER PUBLICATIONS

Translation of CN Search Report from Corresponding CN Application No. 201510846433.3 dated Aug. 2, 2019, a counterpart foreign application for U.S. Appl. No. 15/990,474, 7 pages.

Sivabalan et al., "A novel framework to detect and block ddos attack at the application layer", IEEE 2013 Tencon Spring, Apr. 17-19, 2013, 5 pages.

Wenren, "Distributed Web Security Monitoring System design and implementation", China Excellent Master's Thesis May 31, 2014, 59 pages.

Extended European Search Report dated May 31, 2019 for European Patent Application No. 16867923.1, a counter part of U.S. Appl. No. 15/990,474, 8 pages.

Translated International Search Report from corresponding PCT Application No. PCT/CN2016/106325, dated Feb. 8, 2017, 2 pages.

Translated Written Opinion from corresponding PCT Application No. PCT/CN2016/106325, dated Feb. 8, 2017, 4 pages.

Search Report dated Mar. 18, 2020, from corresponding CN Patent Application No. 201510846433.3, 1 page.

Translation of Japanese Office Action dated Aug. 11, 2020, from corresponding JP Patent Application No. 2018-526929, 11 pages.

\* cited by examiner

EARLY-WARNING DECISION METHOD, NODE AND SUB-SYSTEM

CROSS REFERENCE TO RELATED PATENT APPLICATIONS

This application claims priority to and is a continuation of PCT Patent Application No. PCT/CN2016/106325 filed on 18 Nov. 2016, and is related to and claims priority to Chinese Patent Application No. 201510846433.3, filed on 27 Nov. 2015, entitled "Early-Warning Decision Method, Node and Sub-System," which are hereby incorporated by reference in their entirety.

TECHNICAL FIELD

The present disclosure relates to the technical field of an early warning of a distributed denial of service (DDoS), and particularly to early-warning decision methods, nodes and sub-systems.

BACKGROUND

DDoS attacks usually occupy a large amount of network resources to achieve the goal of paralyzing a network through a large number of service requests. In order to tackle with DDoS attacks, the DDoS attacks can be identified by analyzing flows associated therewith. Flow cleaning is performed to remove an attacking or abnormal service request upon identifying a DDoS attack.

DDoS early-warning system as shown in FIG. 1 is used as an example.

Requested data of a server in a computer room that is accessed reaches an access network device (e.g., a router) of the computer room through network devices of an Internet service provider (ISP). Furthermore, service requests that enter into the access network device of the computer room reaches a load balancing device in their entirety from the network devices of the ISP through a mirroring approach, and are assigned to various distributed flow analysis devices through the load balancing device. A flow analysis device periodically performs a flow analysis of service requests that are assigned to the device. Specifically, statistics are performed on components and flow sizes of service requests within each flow analysis period according to IP addresses. The flow analysis devices then send respective flow analysis results to a decision device, which determines whether abnormality exists in servers of the computer room based on the flow analysis results that are aggregated. If a flow of a certain server is abnormal, a DDoS attack may exist. In this case, a cleaning device is informed to direct the service requests that reach the access network device of the computer room, which are poured back into the access network device of the computer room after cleaning is completed. If no abnormal flow exists in the servers, processing is not performed.

In an event of no DDoS attack, a service request is transmitted to a server in a computer room normally through an access network device of the computer room based on the above processing. In an event of a DDoS attack, after service requests reach the access network device of the computer room, the service requests are first transmitted to a flow cleaning device by flow directing. The service requests are poured back to the access network device of the computer room after flow cleaning is completed, and the service requests are then transmitted to servers in the computer room.

Existing DDoS early-warning systems have only one decision device. When this decision device cannot operate properly due to certain reasons (e.g., an occurrence of a failure), an entire network defense of a computer room fails. Therefore, the reliability and the security of the existing DDoS early-warning systems are relatively poor.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

A goal of the present disclosure is to provide a method, a node and a sub-system for early-warning decision, to solve the problem of the poor reliability and security of existing DDoS early-warning systems.

In implementations, an early-warning decision method is provided, which is used in various distributed nodes that perform early-warning decision for implementations. The method includes the following operations: obtaining a flow analysis result of a portion of service requests that are targeted at a same server; calculating a flow quantity of all the service requests that are targeted at the server based on a flow quantity indicated by the flow analysis result and a weight of a current distributed node, the weight being a weight or proportion of all the service requests targeted at the server that accounts for the flow quantity indicated by the flow analysis result that is obtained by the current distributed node; comparing a flow quantity of all the service requests that are targeted at the server with an abnormal flow threshold; and determining whether to send an instruction for performing subsequent processing on the server based on a comparison result.

In implementations, an early-warning decision node is also provided. The node is a distributed node. The node includes the following modules: a flow analysis result acquisition module used for obtaining a flow analysis result of a portion of service requests that are targeted at a same server; a complete flow estimation module used for calculating a flow quantity of all the service requests that are targeted at the server based on a flow quantity indicated by the flow analysis result and a weight of a current distributed node, the weight being a weight or proportion of all the service requests targeted at the server that accounts for the flow quantity indicated by the flow analysis result that is obtained by the current distributed node; a threshold comparison module used for comparing a flow quantity of all the service requests that are targeted at the server with an abnormal flow threshold; and a determination and control module used for determining whether to send an instruction for performing subsequent processing on the server based on a comparison result.

In implementations, an early-warning decision system is also provided, which includes a plurality of early-warning decision nodes as described above, a plurality of flow analysis nodes, a first load balancing device, and a second load balancing device.

The first load balancing device is used for distributing service requests to the plurality of flow analysis nodes.

The flow analysis nodes receive the service requests, and report flow analysis results to the second load balancing device.

The second load balancing device distributes and assigns the flow analysis results to the plurality of early-warning nodes.

As compared with existing technologies, the present disclosure has the following advantages. An existing DDoS early-warning system has only one decision device. When the decision device cannot operate properly due to certain reasons (e.g., an occurrence of a failure that the decision device cannot operate properly, or a limitation of processing capability of a single decision device), or when an amount of data that needs to be processed exceeds the processing capability of the decision device such that the decision device cannot operate normally, an entire network defense of a computer room fails. The solutions provided by the embodiments of the present disclosure perform an early-warning decision using a distributed framework. Even though a node that performs an early-warning decision cannot operate properly, other normally operated nodes can perform early-warning decisions. As such, the reliability and the security of a DDoS early-warning system are effectively improved. Furthermore, using a distributed framework for performing early-warning decision greatly improves the processing capability as compared to a single decision device. Specifically, each distributed node that performs an early-warning decision has a weight thereof, and this weight is a weight or proportion of all service requests targeted at an associated server that accounts for a flow quantity indicated by a flow analysis result that is obtained by a respective distributed node. Furthermore, for each distributed node, a flow quantity of all service requests targeted at a same server can be estimated based on a weight thereof and a flow quantity indicated by a flow analysis result of a portion of the service requests that are targeted at the same server. By comparing the estimated flow quantity with an abnormal flow threshold, an early-warning decision can be implemented. Using this type of method, a single distributed node can estimate a flow quantity of all service requests with a weight thereof, and thereby implement an early-warning decision under a premise that a flow quantity of a portion of the service requests is obtained. As can be seen, each of the above distributed nodes can perform an early-warning decision. When a distributed node that performs an early-warning decision cannot operate normally, other distributed nodes that perform an early-warning decision can still operate normally, thus improving the reliability and the security of a DDoS early-warning system, and improving the processing capability of the system.

BRIEF DESCRIPTION OF THE DRAWINGS

Other features, goals and advantages of the present disclosure will become more apparent by reading and referencing the detailed description of non-limiting embodiments with the following accompanying drawings.

Figure 1:
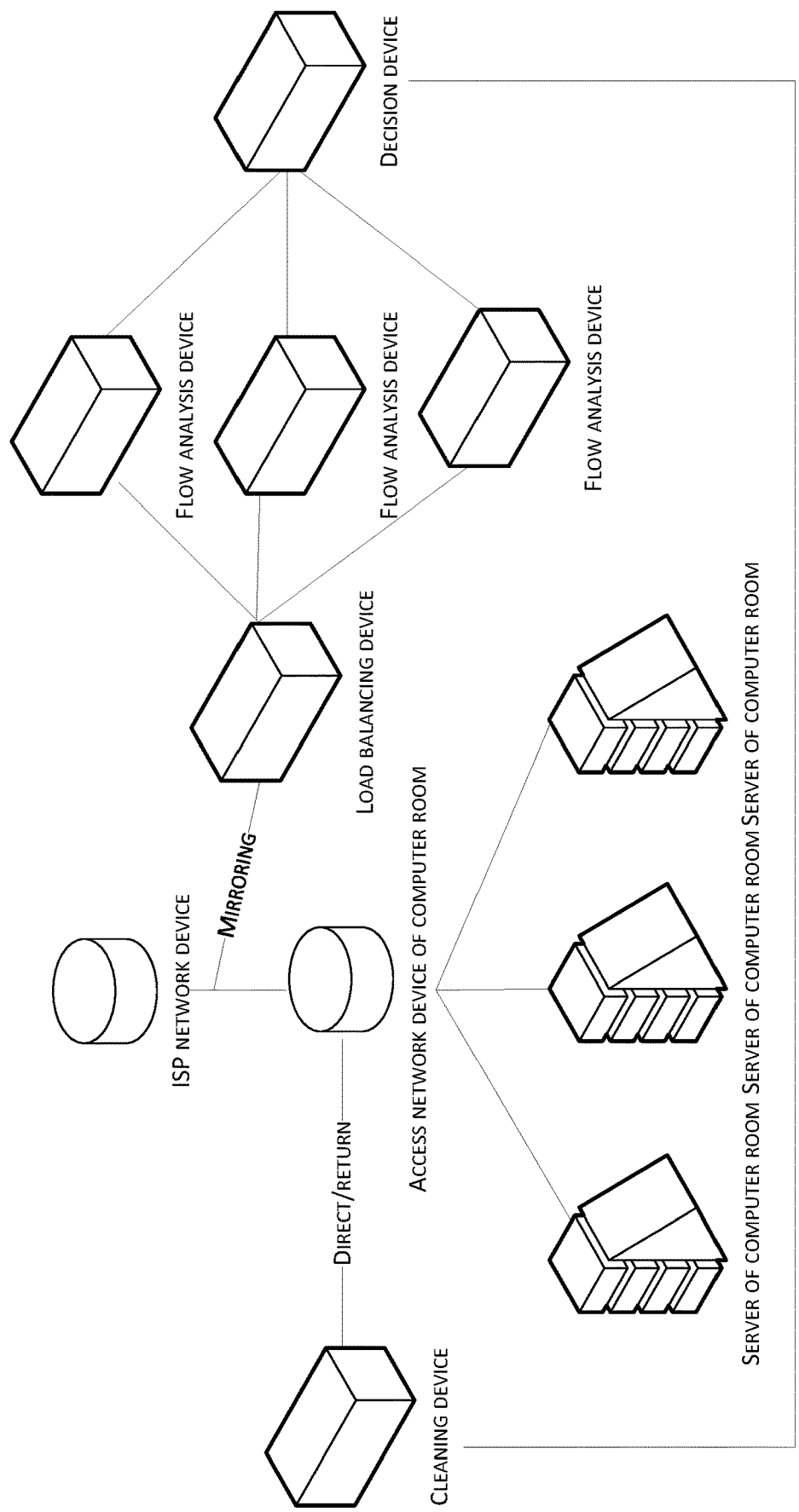
FIG. 1 is a schematic diagram of a DDoS early-warning system in existing technologies.

The same or similar drawing labels in the accompanying drawings represent the same or similar components.

DETAILED DESCRIPTION

Before describing exemplary embodiments in further detail, it should be noted that some exemplary embodiments are described as processes or methods that are shown in flowcharts. Although a flowchart describes various operations in an order, a number of operations can be executed in parallel, simultaneously or at the same time. Moreover, an order of operations can be rearranged. A process can be terminated when operations thereof are completed, and additional operations that are not included in an accompanying drawing may also exist. The process can correspond to a method, a function, a procedure, a sub-routine, a sub-program, etc.

A "node" and a "load balancing device" in the context are a type of computing device, and refer to an intelligent electronic device that executes a predefined processing procedure such as digital computation and/or logical computation by running a predefined program or command, which may include a processor and a storage device. The processor executes pre-stored existing instructions in the storage device to perform the predefined processing procedure. Alternatively, the predefined processing procedure can be executed by hardware such as ASIC, FPGA, DSP, etc. Alternatively, these two types can be combined for implementation.

It should be noted that the computing device is merely an example. Other existing computing devices or computing devices that may appear in the future can be applicable for the present disclosure, and should be included in the scope of protection of the present disclosure, which are included by incorporation.

Methods described hereinafter (some of which are illustrated through flowcharts) can be implemented through hardware, software, firmware, middleware, microcode, hardware description language, or any combination thereof. When software, firmware, middleware or microcode is used for implementation, program codes or code segments that are used for implementing necessary tasks can be stored in machine or computer readable media (such as storage media). (One or more) processors can execute the necessary tasks.

Details of specific structures and functions disclosed herein are merely representative, and are used for describing the goals of the exemplary embodiments of the present disclosure. However, the present disclosure can be implemented through a number of replacement manners, and should not be interpreted to be limited to the embodiments described herein.

It should be noted that a module can be directly connected or coupled with another module, or an intermediate module may exist when the module is said to be "connected" or "coupled" with the other module. In contrast, when a module is said to be "directly connected" or "directly coupled" with another module, no intermediate module exists. Other phrases that are used for describing a relationship between modules (for example, "in between" compared to "directly in between", "adjacent to" compared to "directly adjacent to", etc.) should be interpreted in a similar manner.

Terms used herein are merely used for describing specific embodiments, and are not intended for limiting the exemplary embodiments. Unless explicitly indicated in the context, a singular form "a" and "one" used herein are also intended to include a plural form. It should also be understood that terms "include" and/or "contain" used herein define an existence of features, integers, steps, operations, units and/or components, and do not exclude an existence or addition of one or more other features, integers, steps, operations, units, components and/or combinations thereof.

It should also be noted that functions/actions described in some alternative implementations can be happened according to an order different from those indicated by the accompanying drawings. For example, depending on functions/actions that are involved, two successive figures can actually and basically be executed at the same time or can sometimes be executed in an opposite order.

The present disclosure is described in further detail hereinafter in conjunction with the accompanying drawings.

Figure 2:
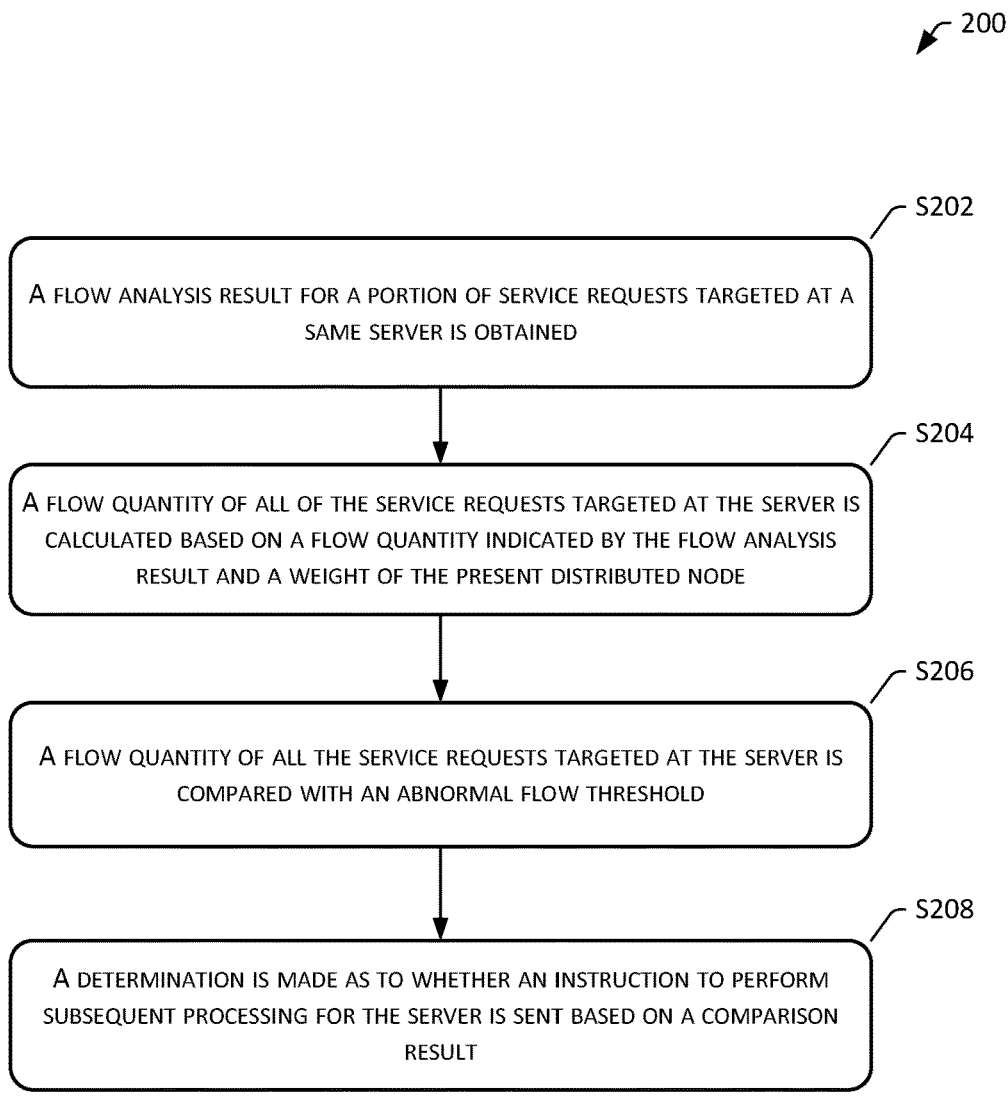
FIG. 2 is a flowchart of a method in accordance with an embodiment of the present disclosure.

FIG. 2 is a process flowchart of an early-warning decision method 200 in accordance with an embodiment of the present disclosure.

The method of the present embodiment is implemented mainly through a computing device, and is particularly suitable for use in various distributed nodes that perform an early-warning decision in a DDoS early-warning system. In a DDoS early-warning system, a flow analysis device analyzes components and a flow size of a flow of each IP address based on IP addresses in service requests (one IP address corresponding to one server). A flow analysis result of the flow analysis device is sent to various distributed nodes that perform an early-warning decision. The technical solutions provided by the embodiments of the present disclosure use various distributed nodes that perform an early-warning decision to calculate a flow quantity of all service requests targeted at a same server and thereby perform an early-warning decision based on a flow quantity indicated by a flow analysis result that is obtained for a portion of the service requests targeted at the server and a weight thereof. As can be seen, in the technical solutions provided by the embodiments of the present disclosure, each distributed node can perform an early-warning decision based on fragmented data. As such, when a distributed node that performs an early-warning decision cannot operate normally, other normally operating distributed nodes can still perform an early-warning decision, thereby improving the reliability and the security of an DDoS early-warning system. Furthermore, the processing capability of multiple distributed nodes is higher than the processing capability of a single decision device. Therefore, the technical solutions provided by the embodiments of the present disclosure further improve the processing capability of the system.

The method according to the present embodiment includes operations S202-S208.

At S202, a flow analysis result for a portion of service requests at a same server is obtained.

In implementations, at S202, a flow analysis result within a current flow analysis period is obtained.

At S204, a flow quantity of all of the service requests at the server is calculated based on a flow quantity indicated by the flow analysis result and a weight of the present distributed node.

In implementations, at S204, a flow quantity of all of the service requests at the server within the current flow analysis period is calculated based on a flow quantity indicated by the flow analysis result and a weight of the present distributed node.

A weight associated with a distributed node is at least a weight or proportion of a flow quantity of all service requests targeted at a server that accounts for a flow quantity indicated by a flow analysis result that is obtained by the distributed node. In particular, a weight associated with a distributed node is a weight or proportion of a flow quantity of all service requests targeted at a server that accounts for a flow quantity indicated by a flow analysis result that is obtained by the distributed node within a flow analysis period. The flow analysis result obtained by the distributed node is a flow analysis result of a portion of service requests targeted at the server.

At S206, the flow quantity of all the service requests at the server is compared with an abnormal flow threshold.

In implementations, at S206, the flow quantity of all the service requests at the server within the current flow analysis period is compared with an abnormal flow threshold.

In the embodiments of the present disclosure, the abnormal flow threshold is determined according to actual conditions. The present disclosure does not have any limitation on specific values thereof.

At S208, a determination is made as to whether an instruction to perform subsequent processing for the server is sent based on a comparison result.

The embodiments of the present disclosure do not have any limitation on the subsequent processing. Examples include subsequent processing such as a flow cleaning, a flow black hole, or a flow analysis, for example.

In the embodiments of the present disclosure, a flow analysis result for a portion of service requests targeted at a same server that is obtained at S202 is fragmented data. In order to implement an early-warning decision, a flow quantity of all of the service requests targeted at the server is calculated based on a flow quantity indicated by the flow analysis result and a weight of the present distributed node at S204. Specifically, an estimated flow quantity is compared with an abnormal flow threshold at S206, and a determination is made as to whether an instruction to perform subsequent processing for the server is sent based on a comparison result at S208. Therefore, the reliability and the security of a DDoS early-warning system are improved, and the processing capability of the system is also improved.

In the embodiments of the present disclosure, S208 may specifically include: determining that the instruction to perform subsequent processing for the server is sent based when the comparison result satisfies a predefined condition, or determining that the instruction to perform subsequent processing for the server is not sent otherwise, the predefined condition being the flow quantity that is compared to be greater than the abnormal flow threshold, or the predefined condition being the flow quantity that is compared to be not less than the abnormal flow threshold.

The predefined condition is the flow quantity that is compared to be greater than the abnormal flow threshold. Alternatively, the predefined condition is the flow quantity that is compared to be not less than the abnormal flow threshold.

It should be noted that, when the comparison result does not satisfies the predefined condition, this indicates that no DDoS attack exists, and an instruction to perform subsequent processing for the server does not need to be sent.

In order to further improve the processing efficiency, in implementations, after S202, the flow analysis result for the portion of the service requests targeted at the server is compared with the abnormal flow threshold. If a comparison result satisfies the predefined condition as described above, an instruction for subsequent processing for the server is sent. Correspondingly, S204 is performed when a comparison result (for a comparison between the flow quantity indicated by the flow analysis result for the portion of the service requests targeted at the server and the abnormal flow threshold) fails to satisfy the predefined threshold.

In the above optional implementation, after a flow analysis result for a portion of service requests targeted at a same server is obtained, a flow quantity indicated by this flow analysis result is first compared with an abnormal flow threshold. If a comparison result satisfies a predefined threshold, an instruction for performing subsequent processing for the server is directly sent, and later operations of the process are no longer performed, thereby further improving the processing efficiency.

For example, an abnormal flow threshold is 10 MBps. If a size of a flow indicated by a flow analysis result for a portion of service requests targeted at a same server within a current flow analysis period that is obtained is 20 MBps, an instruction for performing subsequent processing for the server is sent after determining that the flow quantity indicated by the flow analysis result is greater than the abnormal flow threshold. If a size of a flow indicated by a flow analysis result for a portion of service requests targeted at a same server within a current flow analysis period that is obtained is 8 MBps, a flow quantity of all of the service requests targeted at the server within the current flow analysis period is further needed to be estimated with a weight of the present distributed node. The estimated flow quantity is then compared with an abnormal flow threshold, and a determination is thereby made as to whether an instruction for performing subsequent processing for the server is sent.

Based on any of the above method embodiments, the method provided by the embodiments of the present disclosure can be implemented in a flow analysis device, and can also be implemented by an independent device.

If being implemented by an independent device, a load balancing device distributes and sends a flow analysis result obtained by a flow analysis device to various distributed nodes that perform an early-warning decision. Correspondingly, at S202, the flow analysis result for the portion of the service requests targeted at the same server is obtained from the load balancing device.

If being implemented by a flow analysis device, each flow analysis device that is distributed obtains a portion of service requests targeted at a server as described above from a load balancing device, performs a flow analysis on the portion of the service requests to obtain a flow analysis result for the portion of the service requests targeted at the server, i.e., the flow analysis result obtained after performing a flow analysis by the present device.

Based on any of the above method embodiments, in implementations, the embodiments of the present disclosure further adjust the weight of the present distributed node according to a predefined weight adjustment period to ensure the accuracy of an estimated result.

In the embodiments of the present disclosure, a number of types of implementations of adjusting the weight of the present distributed node exist.

In implementations, in each weight adjustment period, flow quantities indicated by flow analysis results for respective portions of service requests targeted at the server that are obtained by other distributed nodes within a time segment in a current weight adjustment period (e.g., for a weight adjustment period is 60 seconds, and each flow analysis period is 1 second, only the last two flow analysis periods in each weight adjustment period, i.e., the last 2 seconds, are taken) are determined. In each weight adjustment period, a flow quantity of all the service requests targeted at the server within the time segment based on the flow quantities indicated by the flow analysis results for the respective portions of the service requests targeted at the server that are obtained by all the distributed nodes within the time segment is calculated. In each weight adjustment period, a weight of the present distributed node is adjusted for a next weight adjustment period based at least on a weight or proportion of the flow quantity of all the service requests targeted at the server that accounts for a flow quantity indicated by a flow analysis result for a portion of the service requests targeted at the server that is obtained by the present distributed node within the time segment.

For example, if a flow analysis period is 1 second and a weight adjustment period is 60 seconds, the weight is adjusted in every 60 seconds.

Interactions can be conducted with other distributed nodes, and thereby flow quantities indicated by flow analysis results for respective portions of service requests targeted at the server that are obtained by other distributed nodes that perform an early-warning decision within a time segment in a current weight adjustment period are determined. Interactions can also be conducted with a load balancing device, and thereby the flow quantities indicated by the flow analysis results for respective portions of the service requests targeted at the server that are obtained by the other distributed nodes that perform an early-warning decision within the time segment in the current weight adjustment period are determined.

It should be noted that the weight of the present distributed node can also be obtained from the load balancing device according to the predefined weight adjustment period for weight adjustment.

At least a size of a flow is indicated by a flow analysis result. In implementations, flow sizes of components that form each flow are indicated. Correspondingly, based on any of the above method embodiments, an early-warning decision can be performed based on the components of the flow, or the early-warning decision can be performed based on a size of the flow only.

If an early-warning decision can be performed based on a size of a flow only, a size of the flow of all the service requests targeted at the server is calculated based on the size of the flow indicated by the flow analysis result and the weight of the present distributed node at S204. Correspondingly, the size of the flow of all the service requests targeted at the server is compared with the abnormal flow threshold at S206. If the flow indicated by the flow analysis result for the portion of the service requests targeted at the server is also compared with the abnormal flow threshold, the size of the flow of all the service requests targeted at the server is compared with the abnormal flow threshold.

If an early-warning decision can be performed based on components of a flow, and if a flow indicated by a flow analysis result for a portion of service requests targeted at the server is also compared with an abnormal flow threshold, flow sizes corresponding to components of each flow indicated by a flow analysis result for a portion of service requests targeted at the server are separately compared with abnormal flow thresholds corresponding to the components of the respective flow. Correspondingly, at S202, flow sizes of target flow components of all service requests targeted at the server are separately calculated based on flow sizes corresponding to target flow components indicated by the flow analysis result and weights of the present distributed node corresponding to the target flow components. At S206, the flow sizes of the target flow components of all the service requests targeted at the server are separately compared with abnormal flow thresholds corresponding to the target flow components, with the target flow components being flow components that do not satisfy a predefined condition. If the flow indicated by the flow analysis result for the portion of the service requests targeted at the server is not compared with the abnormal flow threshold, flow sizes of flow components of all the service requests targeted at the server are separately calculated based on flow sizes corresponding to flow components indicated by the flow analysis result and weights of the present distributed node corresponding to the flow components at S202 correspondingly. At S206, the flow sizes of the flow components of all the service requests targeted at the server are separately compared with abnormal flow thresholds corresponding to the flow components.

Based thereupon, in implementations, regardless of which comparison is used, when a comparison result satisfies a predefined condition, the operation of sending the instruction for performing the subsequent processing for the server includes sending an instruction for performing subsequent processing of the flow components for the server.

It should be noted that an instruction for performing subsequent processing for the server can also be sent when a comparison result satisfies a predefined condition, without distinguishing specific flow components.

The method provided by the embodiments of the present disclosure is described in further detail in conjunction with a specific application scenario as follows.

Figure 3:
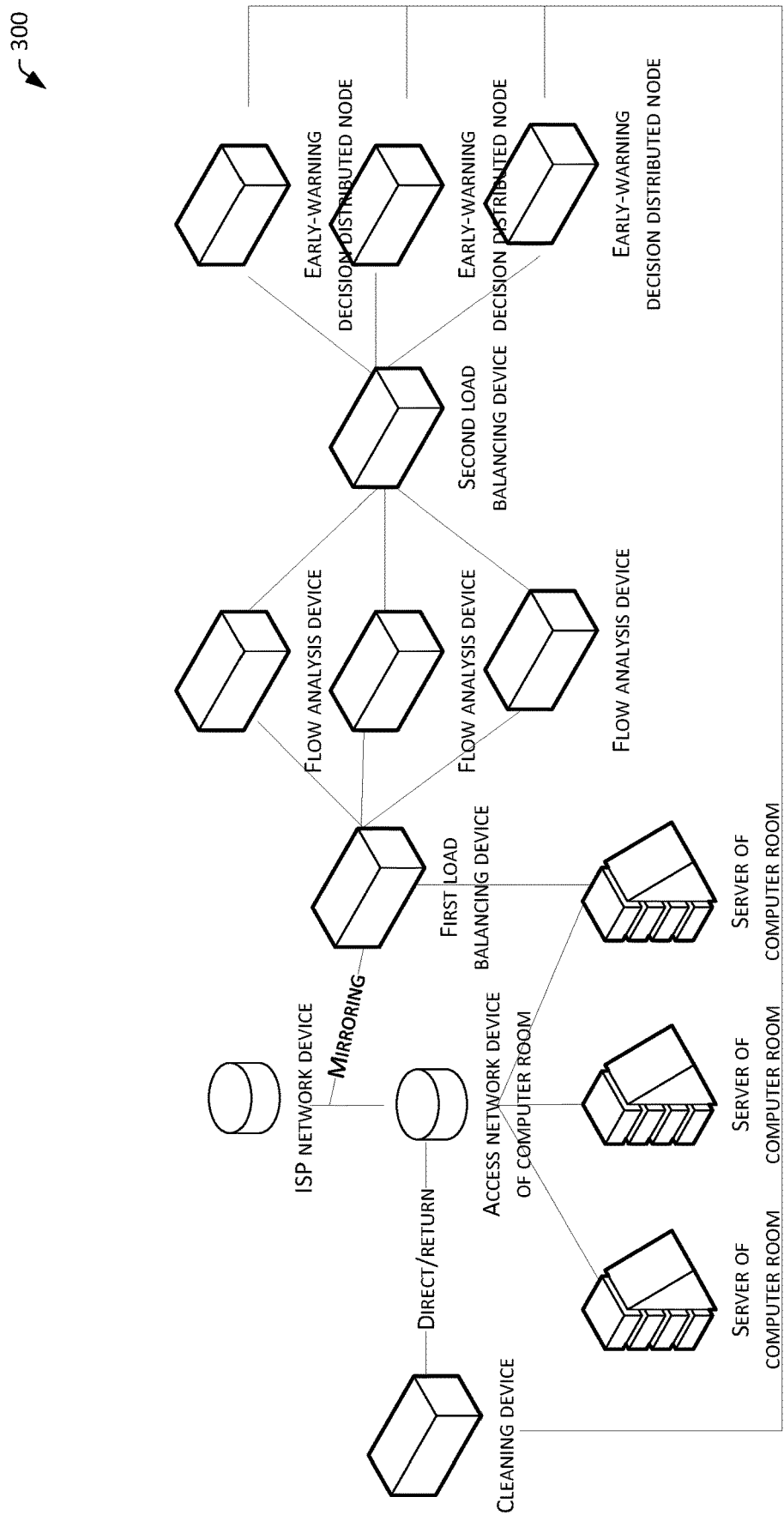
FIG. 3 is a schematic diagram of a DDoS early-warning system in accordance with another embodiment of the present disclosure.

In a system 300 for performing a DDoS early-warning decision for servers that perform electronic commerce, a server in a computer room is used for processing electronic commerce service requests as shown in FIG. 3. Specifically, request data that visits the server in the computer room enters an access network device of the computer room through an ISP network device. Service requests that enter the access network device of the computer room from the ISP network device will reach a first load balancing device in their entirety through a mirroring approach. The first load balancing device assigns and distributes the service requests to various distributed flow analysis devices. A service request includes an IP address of a target server and an access time. A flow analysis device conducts statistics on flow components that are targeted at a same server and sizes of the flow components in each second based on IP addresses and access times. For example, a flow analysis device A performs an analysis on service requests that are received, and an obtained flow size of access requests with IP addresses as a server B and access times as 18 h:10 m:20 s can be represented as 20 MBps, which can also be divided into three flow components a, b and c. A flow size corresponding to the flow component a is 10 MBps, a flow size corresponding to the flow component b is 8 MBps, and a flow size corresponding to the flow component c is 2 MBps. The flow analysis devices send respective flow analysis results to a second load balancing device. The second balancing device assigns and distributes the received flow analysis results to various distributed nodes that perform an early-warning decision. A flow analysis result includes flow components and corresponding flow sizes, and further includes IP address(es) and access time(s) of target server(s). For example, the load balancing device receives 100 pieces of flow analysis results having a same IP address and a same access time, and the number of distributed nodes that perform an early-warning decision is 50. Therefore, these 100 pieces of flow analysis results are even assigned to these 50 distributed nodes. It should be noted that, when a certain distributed node cannot operate normally, the second load balancing device will not assign any flow analysis results thereto, and will evenly assign flow analysis results to normally operating distributed nodes.

Figure 4:
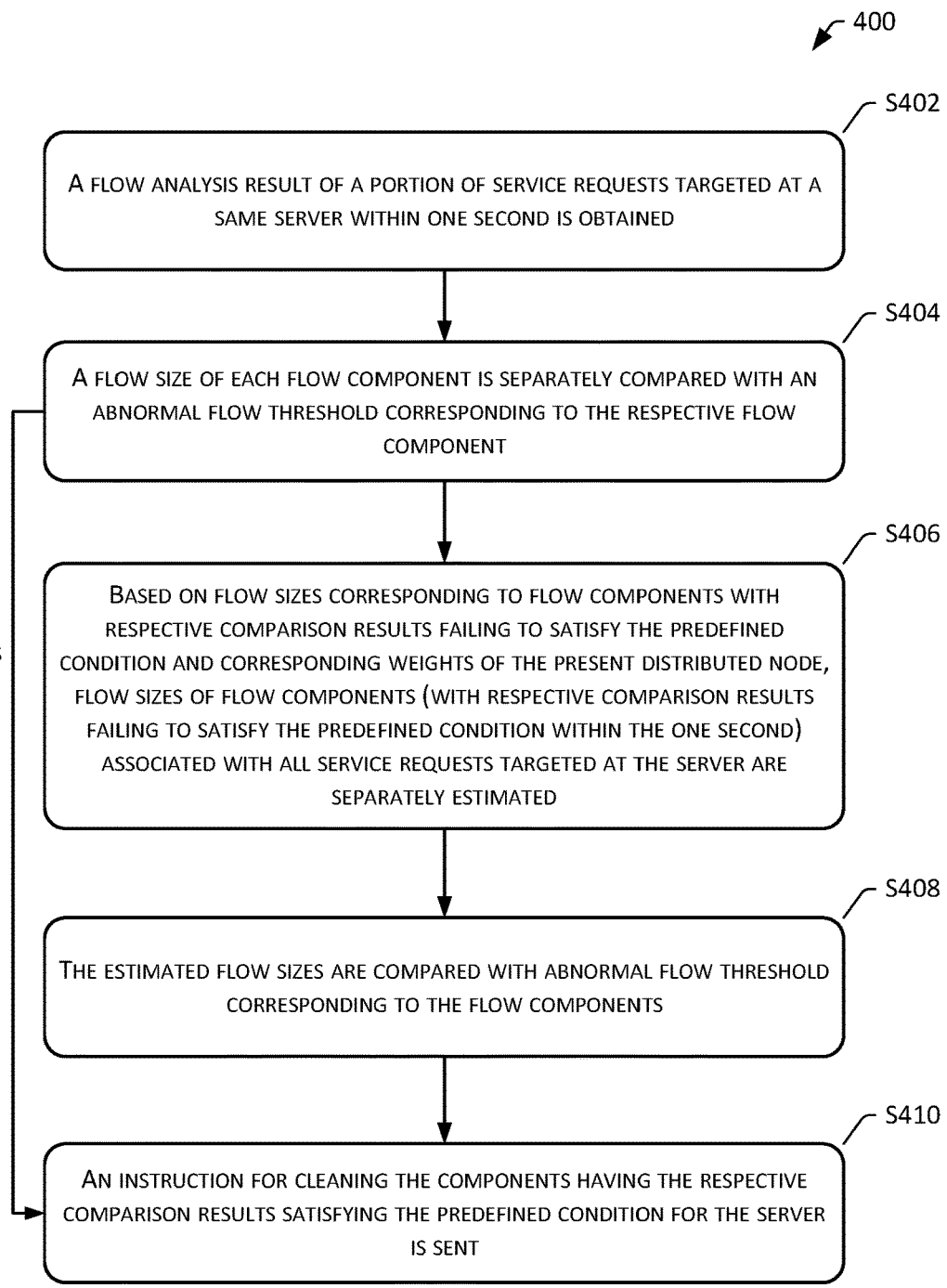
FIG. 4 is a flowchart of a method in accordance with another embodiment of the present disclosure.

As shown in FIG. 4, a distributed node that performs an early-warning decision 400 performs the following operations.

S402: a flow analysis result of a portion of service requests at a same server within one second is obtained.

The flow analysis result includes an IP address and an access time of the server, and flow sizes of flow components.

For example, the number of flow components accessing the server B at 18 h:10 m:20 s is three. A flow size corresponding to a flow component a is 10 MBps, a flow size corresponding to a flow component b is 8 MBps, and a flow size corresponding to a flow component c is 2 MBps.

S404: a flow size of each flow component is separately compared with an abnormal flow threshold corresponding to the respective flow component. S406 is performed for a flow component with a comparison result failing to satisfy a predefined condition. S410 is performed for a flow component with a comparison result satisfying the predefined condition.

Since the number of flow components is limited and can be known in advance, an abnormal flow threshold corresponding to each flow component can be determined in advance.

For example, a total of five types of flow components are known in advance. An abnormal flow threshold corresponding to a flow component a is 8 MBps. An abnormal flow threshold corresponding to a flow component b is 20 MBps. An abnormal flow threshold corresponding to a flow component c is 2 MBps. The other two components are not described as they are not involved in the embodiments of the present disclosure.

S406: Based on flow sizes corresponding to flow components with respective comparison results failing to satisfy the predefined condition and corresponding weights of the present distributed node, flow sizes of flow components (with respective comparison results failing to satisfy the predefined condition within one second as described above) associated with all service requests at the server are separately estimated.

For example, the predefined condition is a flow size being not less than an abnormal flow threshold. Therefore, based on the flow size (8 MBps) of the flow component b and a weight (0.5) of the present distributed node corresponding to the flow component b, a flow size of the flow component b in all the service requests targeted at the server within one second as described above is 16 MBps.

S408: The estimated flow sizes are compared with abnormal flow threshold corresponding to the flow components. No processing is performed for components having respective comparison results failing to satisfy the predefined condition. S410 is performed for components having respective comparison results satisfying the predefined condition.

S410: An instruction for cleaning the components having the respective comparison results satisfying the predefined condition for the server is sent.

In other words, an instruction for cleaning the flow components a and c for the server B is sent.

After receiving the instruction, a cleaning device performs cleaning of service requests that reach the access network device of the computer room, filters out service requests of the flow components a and c while keeping service requests of the flow component b (normal e-commerce service requests), and returns cleaned service requests to the access network device of the computer room.

The access network device of the computer room sends the service requests to corresponding servers in the computer room according to IP addresses.

In the above process, one second is used as an example of the flow analysis period for description. It should be noted that a length of the flow analysis period can be set up according to actual needs in a real application.

In the above process, the load balancing device evenly assigns and distributes the flow analysis results to various normally operating distributed nodes. It should be noted that a load balancing device can be configured with different policies for performing assignment and distribution of flow analysis results in a real application.

Figure 5:
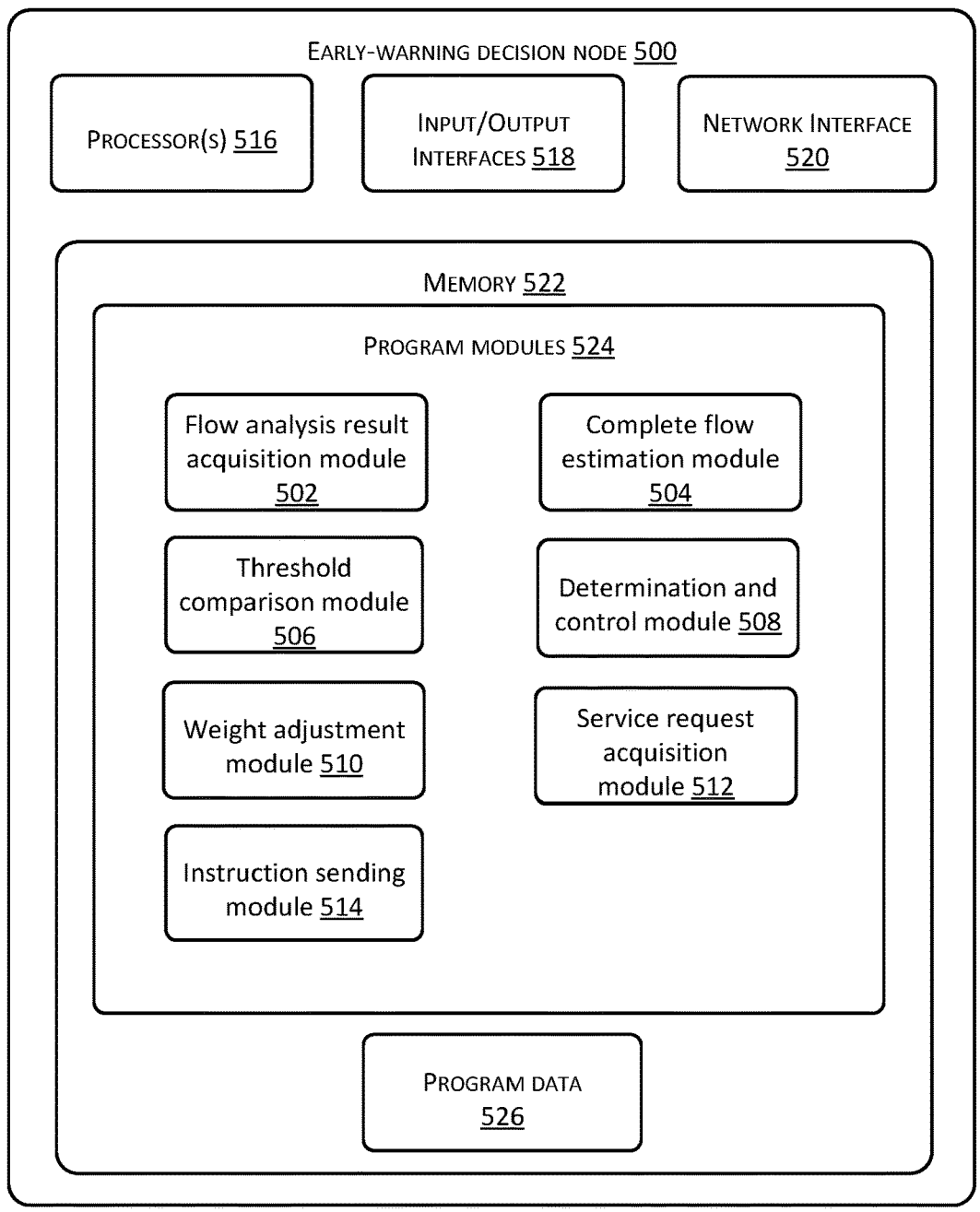
FIG. 5 is a schematic diagram of a node in accordance with another embodiment of the present disclosure.

FIG. 5 is an early-warning decision node 500 in accordance with an embodiment of the present disclosure. In implementations, the node 500 may include one or more computing devices. In implementations, the node 500 may be a part of one or more computing devices. By way of example and not limitation, the node 500 may be a distributed node, and include a flow analysis result acquisition module 502 used for obtaining a flow analysis result of a portion of service requests that are targeted at a same server; a complete flow estimation module 504 used for calculating a flow of all the service requests that are targeted at the server based on a flow indicated by the flow analysis result and a weight of a current distributed node, the weight being a weight or proportion of all the service requests targeted at the server that accounts for the flow indicated by the flow analysis result that is obtained by the current distributed node; a threshold comparison module 506 used for comparing a flow of all the service requests that are targeted at the server with an abnormal flow threshold; and a determination and control module 508 used for determining whether to send an instruction for performing subsequent processing on the server based on a comparison result.

In implementations, the threshold comparison module 506 is further used for determining that the instruction to perform subsequent processing for the server is sent based when the comparison result satisfies a predefined condition; or determining that the instruction to perform subsequent processing for the server is not sent otherwise, the predefined condition being the flow that is compared to be greater than the abnormal flow threshold, or the predefined condition being the flow that is compared to be not less than the abnormal flow threshold.

In implementations, the threshold comparison module 506 is further used for comparing the flow indicated by the flow analysis result for the portion of the service requests targeted at the server with the abnormal flow threshold; and implementing the calculating of the flow of all the service requests that are targeted at the server based on the flow indicated by the flow analysis result and the weight of the current distributed node in response to a comparison result failing to satisfy the predefined condition.

In implementations, the node 500 further includes a weight adjustment module 510, which is used for adjusting the weight of the present distributed node according to a predefined weight adjustment period.

In implementations, the weight adjustment module 510 is further used for:

in each weight adjustment period, determining flows indicated by flow analysis results for respective portions of service requests targeted at the server that are obtained by other distributed nodes within a time segment in a current weight adjustment period;

in each weight adjustment period, calculating a flow of all the service requests targeted at the server within the time segment based on the flows indicated by the flow analysis results for the respective portions of the service requests targeted at the server that are obtained by all the distributed nodes within the time segment; and in each weight adjustment period, adjusting a weight of the present distributed node for a next weight adjustment period based at least on a weight or proportion of the flow of all the service requests targeted at the server that accounts for a flow indicated by a flow analysis result for a portion of the service requests targeted at the server that is obtained by the present distributed node within the time segment.

In implementations, the flow analysis result acquisition module 502 is further used for obtaining the flow analysis result for the portion of the service requests targeted at the same server from a load balancing device.

In implementations, the node 500 further includes a service request acquisition module 512, which is used for obtaining the portion of the service requests targeted at the server from a load balancing device.

The flow analysis result acquisition module 502 is further used for performing a flow analysis of the portion of the service requests to obtain the flow analysis result for the portion of the service requests targeted at the server.

In implementations, the complete flow estimation module 504 is further used for calculating a flow size of all the service requests targeted at the server based on a flow size indicated by the flow analysis result and the weight of the present distributed node.

The threshold comparison module 506 is further used for comparing the flow size indicated by the flow analysis result for the portion of the service requests targeted at the server with the abnormal flow threshold; and comparing the flow size of all the service requests targeted at the server with the abnormal flow threshold when a comparison result fails to satisfy the predefined condition.

In implementations, the threshold comparison module 506 is further used for separately comparing flow sizes corresponding to flow components indicated by the flow analysis result for the portion of the service requests targeted at the server with abnormal flow thresholds corresponding to the flow components; and separately comparing flow size(s) of target flow component(s) of all the service requests targeted at the server with abnormal flow threshold(s) corresponding to the target flow component(s) in response to result(s) of comparison between flow size(s) corresponding to some flow component(s) and corresponding abnormal flow threshold(s) failing to satisfy a predefined condition, the target flow component(s) being the flow component(s) failing to satisfy the predefined condition.

The complete flow estimation module 504 is further used for separately calculating the flow size(s) of the target flow component(s) of all the service requests targeted at the server based on flow size(s) of the target flow component(s) indicated by the flow analysis result and weight(s) of the present distributed node corresponding to the target flow component(s).

In implementations, the node 500 further includes an instruction sending module 514. The instruction sending module 514 is used for sending an instruction of performing subsequent processing on flow components with respective comparison results satisfying the predefined condition for the server.

In implementations, the node 500 may further include one or more processors 516, an input/output interface 518, a network interface 520, and memory 522.

The memory 522 may include a form of computer readable media such as a volatile memory, a random access memory (RAM) and/or a non-volatile memory, for example, a read-only memory (ROM) or a flash RAM. The memory 522 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 522 may include program modules 524 and program data 526. The program modules 524 may include one or more of the modules as describe above.

Based on any of the above node embodiments, in implementations, the subsequent processing includes flow cleaning, a flow black hole, or a flow analysis.

The embodiments of the present disclosure further provide an early-warning decision system. The system includes a plurality of nodes that perform an early-warning decision as described above.

In implementations, a plurality of flow analysis nodes, a first load balancing device and a second load balancing device are further included.

The first load balancing device is used for distributing service requests to the plurality of flow analysis nodes.

The flow analysis nodes receive the service requests, and report flow analysis results to the second load balancing device.

The second load balancing device distributes the flow analysis results to the plurality of early-warning decision nodes.

It should be noted that the present disclosure can be implemented in software and/or a combination of software and hardware. For example, various apparatuses of the present disclosure can be implemented using an application-specific integrated circuit (ASIC) or any other similar hardware. In an embodiment, a software program of the present disclosure can implement the operations or functions as described in the foregoing text through processor(s). Similarly, the software program (which includes related data structure(s)) of the present disclosure can be stored in a computer readable recording media, such as a RAM storage device, a magnetic or optical drive, a floppy disk, or a similar device. Furthermore, some operations or functions of the present disclosure can be implemented by hardware, for example, circuits cooperated with a processor to execute various operations or functions.

Apparently, for one skilled in the art, the present disclosure is not limited to the details of the foregoing exemplary embodiments. The present disclosure can be implemented in other forms without departing the spirit or basic features of the present disclosure. Therefore, regardless of which point of view, the embodiments should be viewed as illustrative, and are not limiting. The scope of the present disclosure is defined by the appended claims and not the above description. Therefore, all modifications falling within the meaning and scope of equivalent elements of the claims are intended to be covered by the present disclosure. Any drawing label in a claim should not be treated as limiting the claim that is involved. Moreover, the term "include" apparently does not exclude other units or operations, and a singular form does not exclude a plural form. Units or apparatuses described in a system claim can be implemented by a single unit or apparatus through software or hardware. Terms such as "first" and "second" are used for representing names, and do not indicate any particular order.

Although exemplary embodiments are specially shown and described in the foregoing, one skilled in the art should understand that changes can exist in forms and details thereof, without departing the spirit and scope of the claims.

The present disclosure may be further understood with clauses as follows.

Clause 1: A method, which is applied in various distributed nodes that perform an early-warning decision, the method comprising: obtaining a flow analysis result of a portion of service requests targeted at a same server; calculating a flow of all the service requests targeted at the server based on a flow indicated by the flow analysis result and a weight of a present distributed node, the weight being a weight or proportion of all the service requests targeted at the server that accounts for the flow indicated by the flow analysis result that is obtained by the current distributed node; comparing a flow of all the service requests targeted at the server with an abnormal flow threshold; and determining whether to send an instruction of performing subsequent processing for the server based on a comparison result.

Clause 2: The method of Clause 1, wherein determining whether to send the instruction for performing the subsequent processing on the server based on the comparison result comprises: determining to send the instruction of performing the subsequent processing for the server when the comparison result satisfies a predefined condition; and determining not to send the instruction of performing the subsequent processing for the server when the comparison result otherwise, the predefined condition being that the flow that is compared is greater than the abnormal flow threshold, or the predefined condition being that the flow that is compared is not less than the abnormal flow threshold.

Clause 3: The method of Clause 2, further comprising: comparing a flow indicated by the flow analysis result for the portion of the service requests targeted at the server with the abnormal flow threshold; and sending the instruction of performing the subsequent processing for the server if a comparison result thereof satisfies the predefined condition, wherein calculating the flow of all the service requests that are targeted at the server based on the flow indicated by the flow analysis result and the weight of the current distributed node is implemented under a premise that the comparison result does not satisfy the predefined condition.

Clause 4: The method of any one of Clause 1-3, further comprising adjusting the weight of the present distributed node according to a predefined weight adjustment period.

Clause 5: The method of Clause 4, wherein adjusting the weight of the present distributed node according to the predefined weight adjustment period comprises: in each weight adjustment period, determining flows indicated by flow analysis results for respective portions of service requests targeted at the server that are obtained by other distributed nodes within a time segment in a current weight adjustment period; in each weight adjustment period, calculating a flow of all the service requests targeted at the server within the time segment based on the flows indicated by the flow analysis results for the respective portions of the service requests targeted at the server that are obtained by all the distributed nodes within the time segment; and in each weight adjustment period, adjusting a weight of the present distributed node for a next weight adjustment period based at least on a weight or proportion of the flow of all the service requests targeted at the server that accounts for a flow indicated by a flow analysis result for a portion of the service requests targeted at the server that is obtained by the present distributed node within the time segment.

Clause 6: The method of any one of Clause 1-3, wherein obtaining the flow analysis result of the portion of the service requests that are targeted at the same server comprises obtaining the flow analysis result of the portion of the service requests that are targeted at the same server from a load balancing device.

Clause 7: The method of any one of Clause 1-3, further comprising obtaining the portion of the service requests targeted at the server from a load balancing device, wherein obtaining the flow analysis result of the portion of the service requests that are targeted at the same server comprises performing a flow analysis of the portion of the service requests to obtain the flow analysis result for the portion of the service requests targeted at the server.

Clause 8: The method of Clause 3, wherein: calculating the flow of all the service requests that are targeted at the server based on the flow indicated by the flow analysis result and the weight of the present distributed node comprises calculating a flow size of all the service requests targeted at the server based on the flow size indicated by the flow analysis result and the weight of the present distributed node; comparing the flow of all the service requests that are targeted at the server with the abnormal flow threshold comprises comparing the flow size of all the service requests targeted at the server with the abnormal flow threshold; and comparing the flow indicated by the flow analysis result for the portion of the service requests targeted at the server with the abnormal flow threshold comprises comparing the flow size indicated by the flow analysis result for the portion of the service requests targeted at the server with the abnormal flow threshold.

Clause 9: The method of Clause 3, wherein: comparing the flow indicated by the flow analysis result for the portion of the service requests targeted at the server with the abnormal flow threshold comprises separately comparing flow sizes corresponding to flow components indicated by the flow analysis result for the portion of the service requests targeted at the server with abnormal flow thresholds corresponding to the flow components; calculating the flow of all the service requests that are targeted at the server based on the flow indicated by the flow analysis result and the weight of the present distributed node comprises separately calculating flow sizes of target flow components of all the service requests targeted at the server based on flow sizes corresponding to target flow components indicated by the flow analysis result and weights of the present distributed node corresponding to the target flow components, the target flow components being flow components that fail to satisfy the predefined condition; and comparing the flow of all the service requests that are targeted at the server with the abnormal flow threshold comprises separately comparing the flow sizes of the target flow components of all the service requests targeted at the server with the abnormal flow thresholds corresponding to the target flow components.

Clause 10: The method of Clause 9, wherein sending the instruction of performing the subsequent processing for the server if the comparison result thereof satisfies the predefined condition comprises sending an instruction of performing subsequent processing on flow components with respective comparison results satisfying the predefined condition for the server.

Clause 11: The method of any one of Clause 1-3 and 10, wherein the subsequent processing comprises flow cleaning, cleaning black hole, or flow analysis.

Clause 12: An early-warning decision node, wherein the node is a distributed node, and the node comprises the following modules: a flow analysis result acquisition module used for obtaining a flow analysis result of a portion of service requests targeted at a same server; a complete flow estimation module used for calculating a flow of all the service requests targeted at the server based on a flow indicated by the flow analysis result and a weight of a present distributed node, the weight being a weight or proportion of all the service requests targeted at the server that accounts for the flow indicated by the flow analysis result that is obtained by the present distributed node; a threshold comparison module used for comparing a flow of all the service requests targeted at the server with an abnormal flow threshold; and a determination and control module used for determining whether to send an instruction for performing subsequent processing on the server based on a comparison result.

Clause 13: The node of Clause 12, wherein the threshold comparison module is used for:

determining to send the instruction of performing the subsequent processing for the server when the comparison result satisfies a predefined condition; and determining not to send the instruction of performing the subsequent processing for the server when the comparison result otherwise, the predefined condition being that the flow that is compared is greater than the abnormal flow threshold, or the predefined condition being that the flow that is compared is not less than the abnormal flow threshold.

Clause 14: The node of Clause 12, wherein the threshold comparison module is further used for: comparing a flow indicated by the flow analysis result for the portion of the service requests targeted at the server with the abnormal flow threshold; and sending the instruction of performing the subsequent processing for the server if a comparison result thereof satisfies the predefined condition, wherein calculating the flow of all the service requests that are targeted at the server based on the flow indicated by the flow analysis result and the weight of the current distributed node is implemented under a premise that the comparison result does not satisfy the predefined condition.

Clause 15: The node of any one of Clause 12-14, further comprising a weight adjustment module used for adjusting the weight of the present distributed node according to a predefined weight adjustment period.

Clause 16: The node of Clause 15, wherein the weight adjustment module is used for: in each weight adjustment period, determining flows indicated by flow analysis results for respective portions of service requests targeted at the server that are obtained by other distributed nodes within a time segment in a current weight adjustment period; in each weight adjustment period, calculating a flow of all the service requests targeted at the server within the time segment based on the flows indicated by the flow analysis results for the respective portions of the service requests targeted at the server that are obtained by all the distributed nodes within the time segment; and in each weight adjustment period, adjusting a weight of the present distributed node for a next weight adjustment period based at least on a weight or proportion of the flow of all the service requests targeted at the server that accounts for a flow indicated by a flow analysis result for a portion of the service requests targeted at the server that is obtained by the present distributed node within the time segment.

Clause 17: The node of any one of Clause 12-14, wherein the flow analysis result acquisition module is used for obtaining the flow analysis result of the portion of the service requests that are targeted at the same server from a load balancing device.

Clause 18: The node of any one of Clause 12-14, wherein the node further comprises a service request acquisition module used for obtaining the portion of the service requests targeted at the server from a load balancing device, wherein the flow analysis result acquisition module is used for performing a flow analysis of the portion of the service requests to obtain the flow analysis result for the portion of the service requests targeted at the server.

Clause 19: The node of Clause 14, wherein: the complete flow estimation module is used for calculating a flow size of all the service requests targeted at the server based on the flow size indicated by the flow analysis result and the weight of the present distributed node; and the threshold comparison module is used for comparing the flow size indicated by the flow analysis result for the portion of the service requests targeted at the server with the abnormal flow threshold, and comparing the flow size of all the service requests targeted at the server with the abnormal flow threshold when the comparison result fails to satisfy the predefined condition.

Clause 20: The node of Clause 14, wherein: the threshold comparison module is used for separately comparing flow sizes corresponding to flow components indicated by the flow analysis result for the portion of the service requests targeted at the server with abnormal flow thresholds corresponding to the flow components, and separately comparing flow sizes of target flow components of all the service requests targeted at the server with abnormal flow thresholds corresponding to the target flow components when comparison results between flow sizes of a number of flow components and corresponding abnormal flow thresholds fail to satisfy the predefined condition, the target flow components being flow components that fail to satisfy the predefined condition; and the complete flow estimation module is used for calculating flow sizes of target flow components of all the service requests targeted at the server based on the flow sizes corresponding to target flow components indicated by the flow analysis result and the weights of the present distributed node corresponding to the target flow components.

Clause 21: The node of Clause 20, further comprising an instruction sending module used for sending an instruction of performing subsequent processing on flow components with respective comparison results satisfying the predefined condition for the server.

Clause 22: The node of any one of Clause 12, 13 and 21, wherein the subsequent processing comprises flow cleaning, cleaning black hole, or flow analysis.

Clause 23: An early-warning decision system comprising: a plurality of early-warning decision nodes of any one of Clause 12-22, a plurality of flow analysis nodes, a first load balancing device, and a second load balancing device, wherein: the first load balancing device is used for distributing service requests to the plurality of flow analysis nodes; the flow analysis nodes receive the service requests, and report flow analysis results to the second load balancing device; and the second load balancing device distributes and assigns the flow analysis results to the plurality of early-warning nodes.

What is claimed is:

1. A method for performing an early-warning decision, comprising:
    receiving, by a first load balancing device, service requests and distributing the service requests to various distributed flow analysis devices;
    receiving, by a second load balancing device, respective flow analysis results from the various distributed flow analysis devices;
    obtaining, by a distributed node, a flow analysis result of a portion of service requests at a server from the second load balancing device;
    calculating, by the distributed node, a flow quantity of all the service requests at the server based on a flow indicated by the flow analysis result and a weight of the distributed node, the weight being a weight or proportion of all the service requests at the server that accounts for the flow indicated by the flow analysis result that is obtained by the distributed node;
    comparing, by the distributed node, the flow quantity of all the service requests at the server with a threshold to obtain a comparison result; and
    determining, by the distributed node, whether to send an instruction of performing subsequent processing for the server based on whether the comparison result satisfies a predefined condition, wherein the subsequent processing comprises flow cleaning by a cleaning device.

2. The method of claim 1, wherein determining whether to send the instruction for performing the subsequent processing on the server based on whether the comparison result satisfies the predefined condition comprises:
    determining to send the instruction of performing the subsequent processing for the server when the comparison result satisfies the predefined condition; and
    determining not to send the instruction of performing the subsequent processing for the server when the comparison result does not satisfy the predefined condition, the predefined condition being that the flow quantity that is compared is greater than the threshold, or the predefined condition being that the flow quantity that is compared is not less than the threshold.

3. The method of claim 2, further comprising:
    comparing a flow indicated by the flow analysis result for the portion of the service requests targeted at the server with the threshold; and
    sending the instruction of performing the subsequent processing for the server if a corresponding comparison result between the flow indicated by the flow analysis result for the portion of the service requests targeted at the server and the threshold satisfies the predefined condition, wherein calculating the flow quantity of all the service requests at the server based on the flow indicated by the flow analysis result and the weight of a current distributed node is implemented under a premise that the corresponding comparison result does not satisfy the predefined condition.

4. The method of claim 1, further comprising adjusting the weight of the distributed node according to a predefined weight adjustment period.

5. The method of claim 1, wherein obtaining the flow analysis result of the portion of the service requests at the server comprises performing a flow analysis of the portion of the service requests to obtain the flow analysis result for the portion of the service requests at the server.

6. The method of claim 1, wherein the subsequent processing comprises cleaning black hole or flow analysis.

7. A system, comprising:
one or more processors of a node;
memory;
a first load balancing device configured to receive service requests and distribute the service requests to various distributed flow analysis devices;
a second load balancing device configured to receive respective flow analysis results from the various distributed flow analysis devices;
a flow analysis result acquisition module stored in the memory and executable by the one or more processors to obtain a flow analysis result of a portion of service requests at a server from the second load balancing device;
a complete flow estimation module in the memory and executable by the one or more processors to calculate a flow quantity of all the service requests at the server based on a flow indicated by the flow analysis result and a weight of the node, the weight being a weight all the service requests the server that accounts for the flow indicated by the flow analysis result that is obtained by the node;
a threshold comparison module in the memory and executable by the one or more processors to compare a flow quantity of all the service requests at the server with a flow threshold to obtain a comparison result; and
a determination and control module in the memory and executable by the one or more processors to determine whether to send an instruction for performing subsequent processing on the server based on whether the comparison result satisfies a predefined condition, wherein the subsequent processing comprises flow cleaning by a cleaning device.

8. The node of claim 7, wherein the threshold comparison module is used for:
determining to send the instruction of performing the subsequent processing for the server when the comparison result satisfies the predefined condition; and
determining not to send the instruction of performing the subsequent processing for the server when the comparison result does not satisfy the predefined condition, the predefined condition being that the flow quantity that is compared is greater than the threshold, or the predefined condition being that the flow quantity that is compared is not less than the threshold.

9. The node of claim 7, wherein the threshold comparison module is further used for:
comparing a flow indicated by the flow analysis result for the portion of the service requests at the server with the threshold; and
sending the instruction of performing the subsequent processing for the server if a corresponding comparison result between the flow indicated by the flow analysis result for the portion of the service requests targeted at the server and the threshold satisfies the predefined condition, wherein calculating the flow quantity of all the service requests at the server based on the flow indicated by the flow analysis result and the weight of the node is implemented under a premise that the comparison result does not satisfy the predefined condition.

10. The node of claim 7, further comprising a weight adjustment module used for adjusting the weight of the node according to a predefined weight adjustment period.

11. The node of claim 10, wherein the weight adjustment module is used for:
in each weight adjustment period, determining flows indicated by flow analysis results for respective portions of service requests at the server that are obtained by other distributed nodes within a time segment in a current weight adjustment period;
in each weight adjustment period, calculating a flow quantity of all the service requests at the server within the time segment based on the flow quantities indicated by the flow analysis results for the respective portions of the service requests at the server that are obtained by all the distributed nodes within the time segment; and
in each weight adjustment period, adjusting a weight of the node for a next weight adjustment period based at least on a weight accounted for a flow indicated by a flow analysis result for a portion of the service requests at the server that is obtained by the node within the time segment w in the flow quantity of all the service requests at the server.

12. The node of claim 7, wherein the flow analysis result acquisition module is used for performing a flow analysis of the portion of the service requests to obtain the flow analysis result for the portion of the service requests at the server.

13. One or more computer readable media storing executable instructions that, when executed by one or more processors of system comprising a distributed node, cause the one or more processors to perform acts for performing an early-warning decision, comprising:
receiving, by a first load balancing device, service requests and distributing the service requests to various distributed flow analysis devices;
receiving, by a second load balancing device, respective flow analysis results from the various distributed flow analysis devices;
obtaining a flow analysis result of a portion of service requests at a server from the second load balancing device;
calculating a flow quantity of all the service requests at the server based on a flow indicated by the flow analysis result and a weight of the distributed node, the weight being a weight or proportion of all the service requests at the server that accounts for the flow indicated by the flow analysis result that is obtained by the distributed node;
comparing the flow quantity of all the service requests at the server with a threshold to obtain a comparison result; and
determining whether to send an instruction of performing subsequent processing for the server based on whether the comparison result satisfies a predefined condition, wherein the subsequent processing comprises flow cleaning by a cleaning device.

14. The one or more computer readable media of claim 13, wherein determining whether to send the instruction for performing the subsequent processing on the server based on whether the comparison result satisfies the predefined condition comprises:
determining to send the instruction of performing the subsequent processing for the server when the comparison result satisfies the predefined condition; and
determining not to send the instruction of performing the subsequent processing for the server when the comparison result does not satisfy the predefined condition, the predefined condition being that the flow quantity that is compared is greater than the threshold, or the predefined condition being that the flow quantity that is compared is not less than the threshold.

15. The one or more computer readable media of claim 14, the acts further comprising:
comparing a flow indicated by the flow analysis result for the portion of the service requests targeted at the server with the threshold; and
sending the instruction of performing the subsequent processing for the server if a corresponding comparison result between the flow indicated by the flow analysis result for the portion of the service requests targeted at the server and the threshold satisfies the predefined condition, wherein calculating the flow quantity of all the service requests at the server based on the flow indicated by the flow analysis result and the weight of the current distributed node is implemented under a premise that the corresponding comparison result does not satisfy the predefined condition.

16. The one or more computer readable media of claim 13, the acts further comprising further comprising adjusting the weight of the present distributed node according to a predefined weight adjustment period.

17. The one or more computer readable media of claim 13, wherein obtaining the flow analysis result of the portion of the service requests at the server comprises performing a flow analysis of the portion of the service requests to obtain the flow analysis result for the portion of the service requests at the server.

* * * * *